US009536526B2

(12) United States Patent
Yamaguchi

(10) Patent No.: US 9,536,526 B2
(45) Date of Patent: Jan. 3, 2017

(54) ELECTRONIC DEVICE WITH SPEAKER IDENTIFICATION, METHOD AND STORAGE MEDIUM

(71) Applicant: KABUSHIKI KAISHA TOSHIBA, Minato-ku, Tokyo (JP)

(72) Inventor: Ryuichi Yamaguchi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/662,609

(22) Filed: Mar. 19, 2015

(65) Prior Publication Data
US 2016/0086608 A1 Mar. 24, 2016

(30) Foreign Application Priority Data

Sep. 22, 2014 (JP) ................................. 2014-192588

(51) Int. Cl.
*G10L 17/22* (2013.01)
*G10L 17/02* (2013.01)
*G10L 21/10* (2013.01)

(52) U.S. Cl.
CPC .............. *G10L 17/22* (2013.01); *G10L 17/02* (2013.01); *G10L 21/10* (2013.01)

(58) Field of Classification Search
None
See application file for complete search history.

(56) References Cited

U.S. PATENT DOCUMENTS

| 5,659,662 A * | 8/1997 | Wilcox ................ G06K 9/6219 704/243 |
| 8,675,973 B2 | 3/2014 | Hirohata et al. |
| 2002/0091517 A1* | 7/2002 | Frank .................... G10L 21/028 704/231 |
| 2011/0222785 A1* | 9/2011 | Hirohata ............ G06K 9/00288 382/224 |
| 2012/0323575 A1* | 12/2012 | Gibbon .................. G11B 27/28 704/246 |
| 2013/0144414 A1* | 6/2013 | Kajarekar ............... G10L 17/02 700/94 |
| 2015/0058017 A1* | 2/2015 | Singh ..................... G06F 21/10 704/249 |

FOREIGN PATENT DOCUMENTS

| JP | 2007-256498 | 10/2007 |
| JP | 2010-266522 | 11/2010 |
| JP | 2011-191824 | 9/2011 |
| JP | 5174068 | 4/2013 |

* cited by examiner

*Primary Examiner* — Douglas Godbold
(74) *Attorney, Agent, or Firm* — Knobbe, Martens, Olson & Bear LLP

(57) ABSTRACT

According to one embodiment, an electronic device includes a display controller and circuitry. The display controller displays a first object indicative of a first speaker, a first object indicative of a second speaker different from the first speaker, a second object indicative of a first speech period identified as a speech of the first speaker, and a second object indicative of a second speech period identified as a speech of the second speaker. The circuitry integrates the first speech period and the second speech period into a speech period of a same speaker when a first operation of associating the first object indicative of the first speaker with the first object indicative of the second speaker is operated.

12 Claims, 11 Drawing Sheets

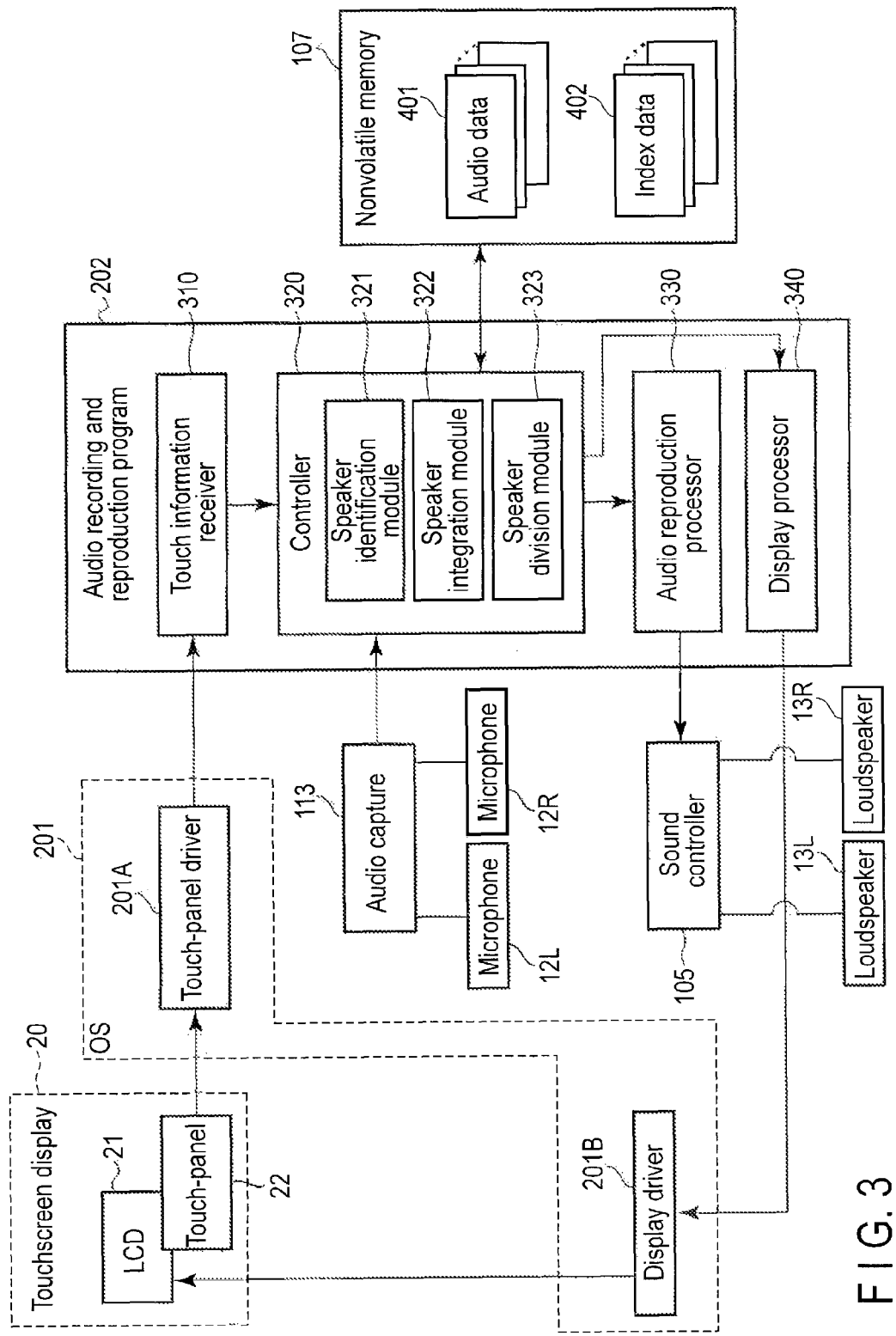
F I G. 3

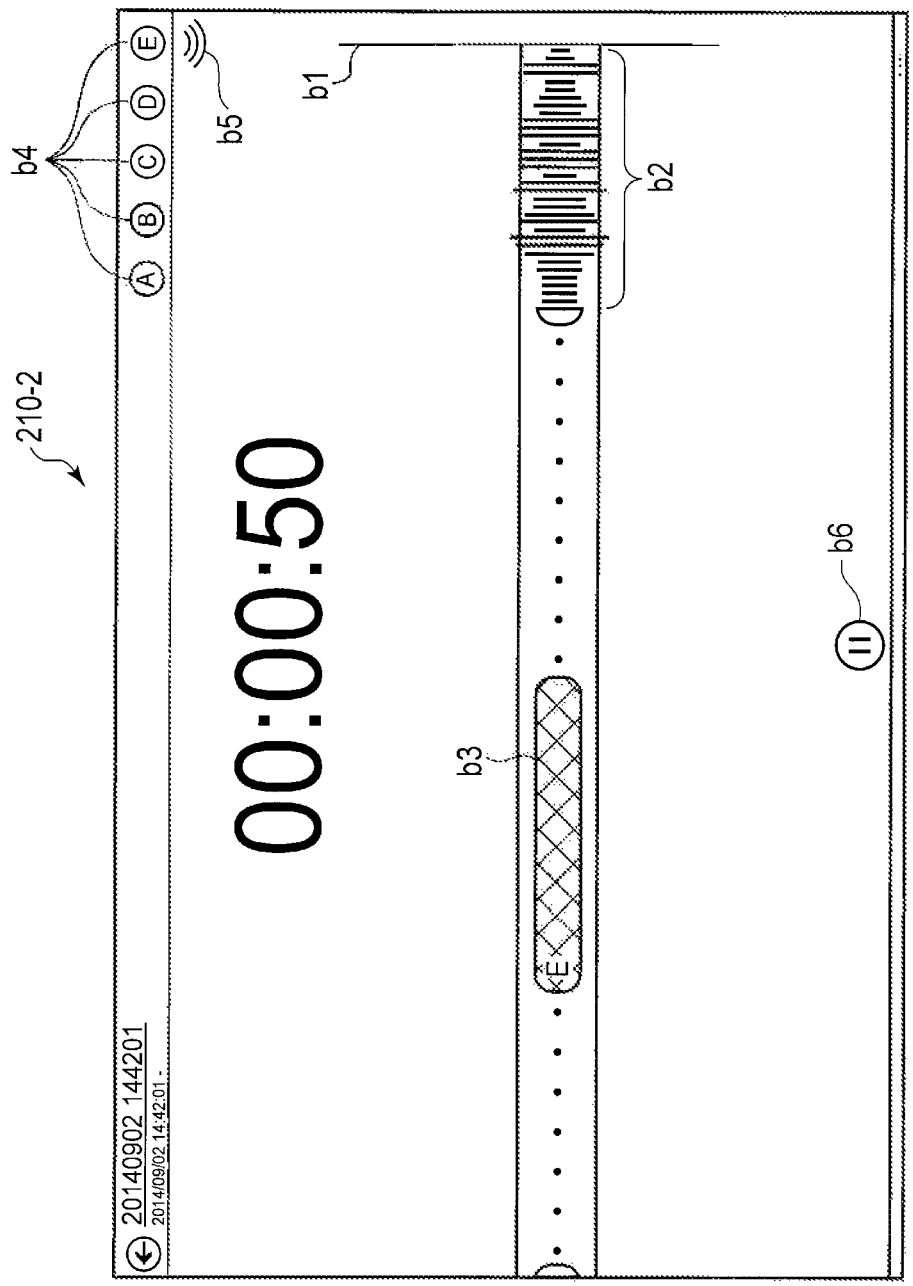
F I G. 6

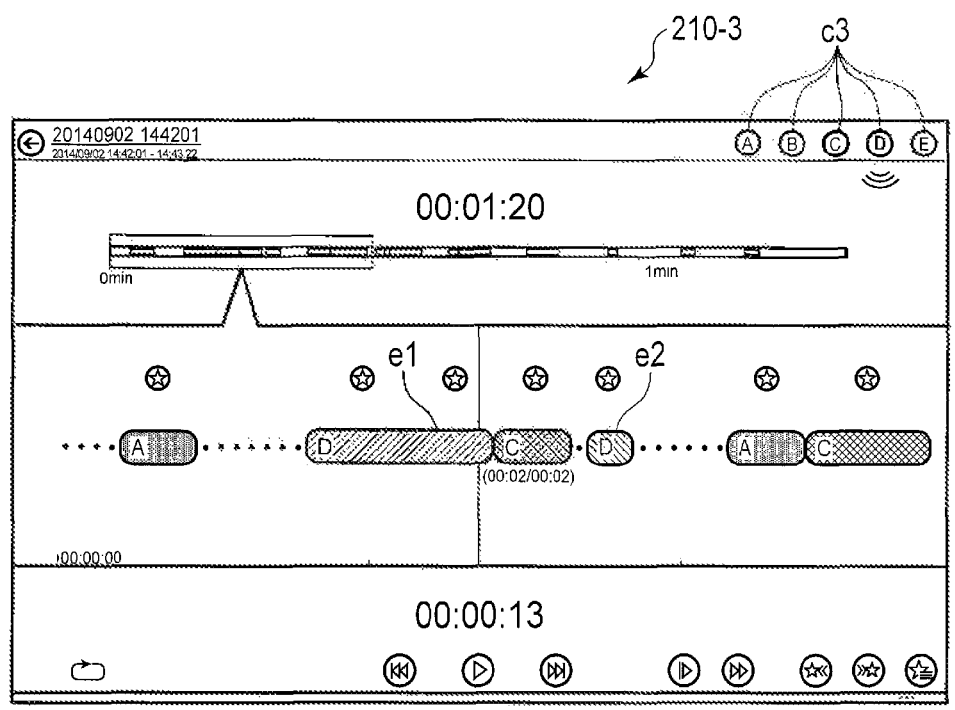
F I G. 10
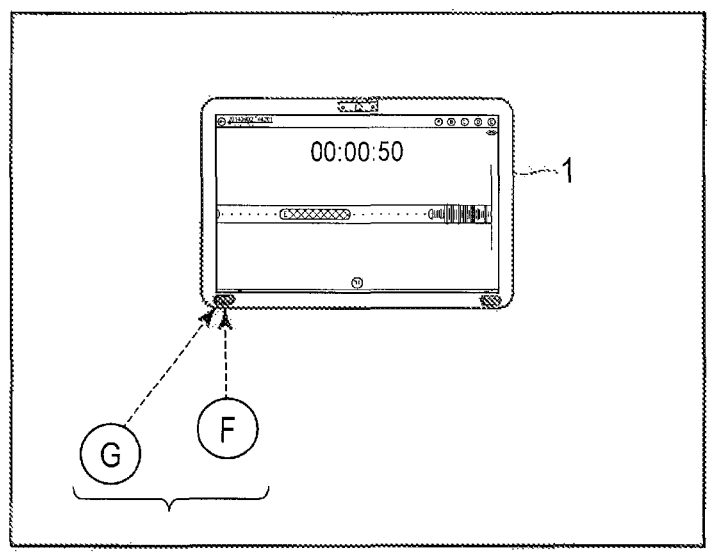
F I G. 11

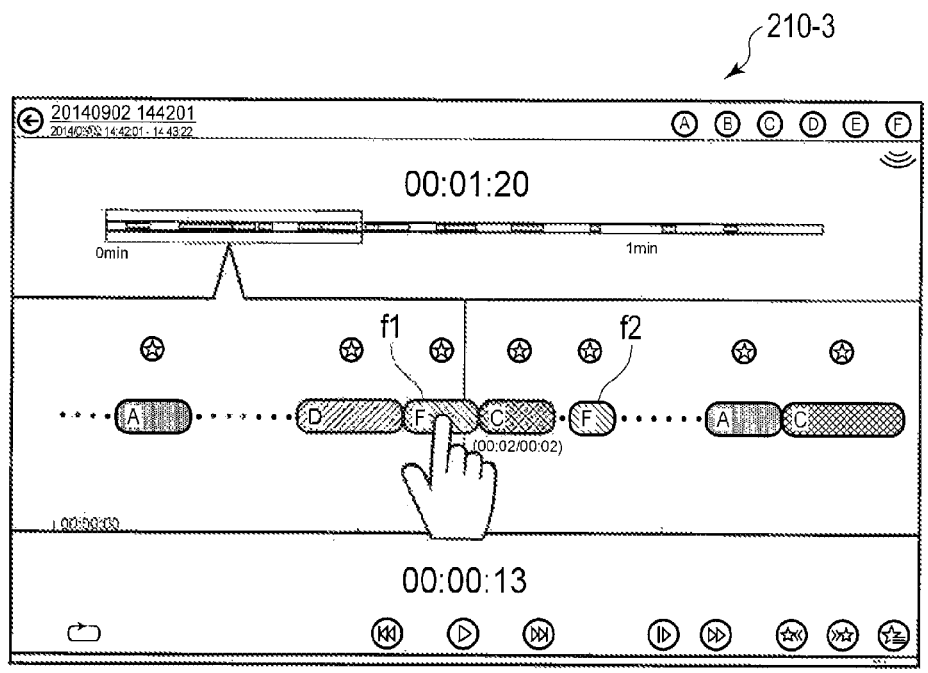
F I G. 12
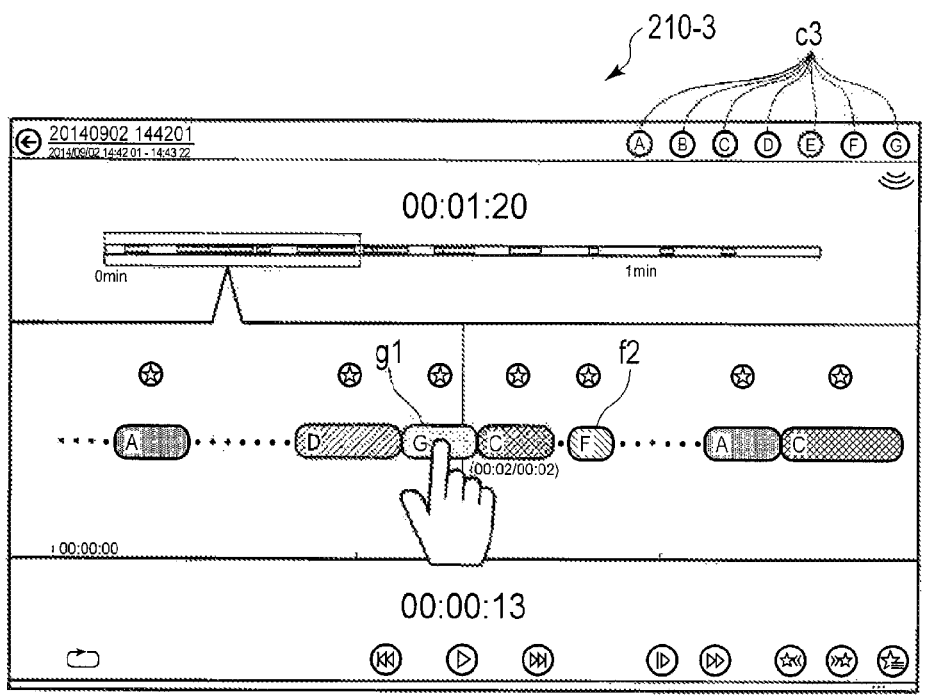
F I G. 13

ELECTRONIC DEVICE WITH SPEAKER IDENTIFICATION, METHOD AND STORAGE MEDIUM

CROSS-REFERENCE TO RELATED APPLICATIONS

This application is based upon and claims the benefit of priority from Japanese Patent Application No. 2014-192588, filed Sep. 22, 2014, the entire contents of which are incorporated herein by reference.

FIELD

Embodiments described herein relate generally to an electronic device, a method and a storage medium.

BACKGROUND

Recently, battery-powered portable electronic devices such as tablets and smartphones have become widespread. Such electronic devices generally comprise a touchscreen display enabling an input operation by touching a display surface. Many of these electronic devices comprise a microphone and a loudspeaker, and can be used as a recorder to, for example, record and reproduce conversation at a meeting.

Currently, various methods for analyzing voice and identifying a speaker are known. For example, when speech of conversation recorded at a meeting is reproduced in order to prepare minutes of the meeting, a display screen which allows the user to visually confirm whose speech is can be provided by identifying a speaker by these methods. That is, the speech can be visualized to support preparation of the minutes of the meeting, etc.

However, the speaker identification is not necessarily executed with 100% accuracy under various influences such as recording environment. Speech of the same person can be identified as speech of a plurality of persons, and speech of a plurality of persons can be identified as speech of the same person.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram showing an example of a function structure (functional blocks) of an audio recording and reproduction program which operates on the electronic device of the embodiment.

FIG. 6 is an exemplary illustration showing an example of a recording screen displayed by the audio recording and reproduction program which operates on the electronic device of the embodiment.

FIG. 10 is an exemplary third illustration for explaining the user interface provided for speaker integration by the audio recording and reproduction program which operates on the electronic device of the embodiment.

FIG. 11 is an exemplary first illustration for explaining a user interface provided for speaker division by the audio recording and reproduction program which operates on the electronic device of the embodiment.

FIG. 12 is an exemplary second illustration for explaining the user interface provided for speaker division by the audio recording and reproduction program which operates on the electronic device of the embodiment.

FIG. 13 is an exemplary third illustration for explaining the user interface provided for speaker division by the audio recording and reproduction program which operates on the electronic device of the embodiment.

DETAILED DESCRIPTION

Various embodiments will be described hereinafter with reference to the accompanying drawings.

In general, according to one embodiment, an electronic device includes a receiver, a display controller and circuitry. The receiver is configured to receive audio data corresponding to speech from one or more speakers. The display controller is configured to display a first object indicative of a first speaker, a first object indicative of a second speaker different from the first speaker, a second object indicative of a first speech period automatically identified as a speech of the first speaker, and a second object indicative of a second speech period automatically identified as a speech of the second speaker, based on the audio data. The circuitry is configured to integrate the first speech period and the second speech period into a speech period of a same speaker and cause the integrated speech period to be displayed, when a first operation comprising an operation of associating the first object indicative of the first speaker with the first object indicative of the second speaker is operated.

An electronic device of the present embodiment can be implemented as, for example, a tablet, a smartphone, a personal digital assistant (PDA), etc. It is assumed that the electronic device is implemented as a tablet. Elements and configurations hereinafter described can be implemented by use of not only hardware, but also software using a microcomputer (processing unit, central processing unit [CPU]).

Figure 1:
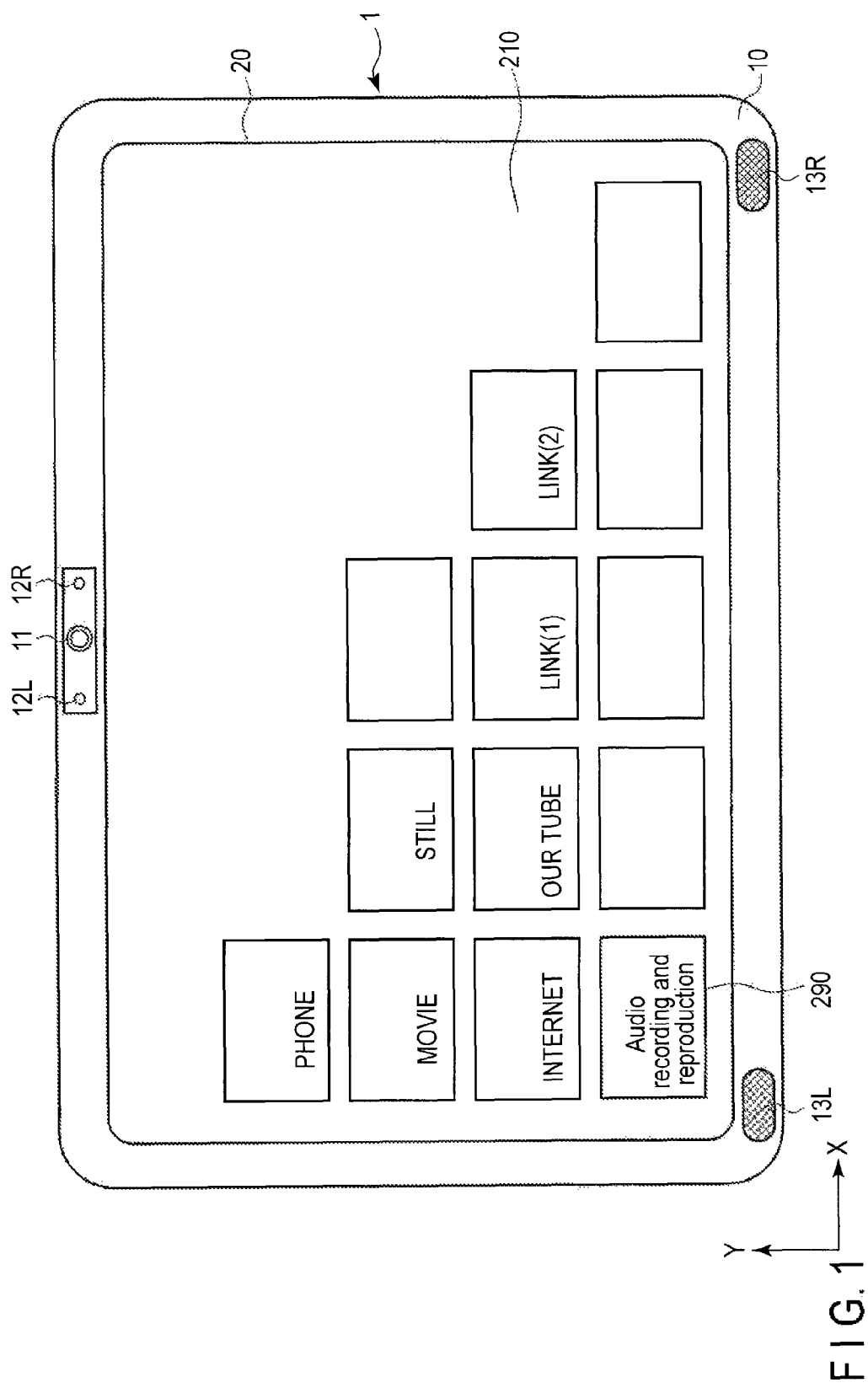
FIG. 1 is an exemplary illustration showing an example of an appearance of an electronic device of an embodiment.

FIG. 1 is an exemplary illustration showing an example of an appearance of a tablet 1. As shown in FIG. 1, the tablet 1 comprises a body unit (PC body) 10 and a touchscreen display 20.

A camera unit 11, which captures, as video (image information), information representing a subject facing the touchscreen display 20, such as the user, and the background to the user or an object around the user, is provided at a predetermined position on the PC body 10. First and second microphones 12R and 12L which capture voice of the user or an arbitrary number of persons around the user or ambient sound are also provided in predetermined positions on the PC body 10. The first and second microphones 12R and 12L are positioned, for example, either side of the camera unit 11 and substantially equidistant therefrom. Two microphones are provided in the present embodiment, but only one microphone may be provided.

Loudspeakers 13R and 13L which reproduce voice/sound data (hereinafter referred to as audio data) kept by the PC body 10 are provided in predetermined positions on the PC body 10. A power-on switch (power button), a lock mechanism, an authentication unit, etc., are provided in predetermined positions on the PC body 10, but are not described in detail. The power button controls power-on and power-off for enabling the tablet 1 (i.e., activating the tablet 1). The lock mechanism locks operations of the power button, for example, when the tablet 1 is being carried. The authentication unit reads (biological) information associated with the user's fingers or palm to authenticate the user.

The touchscreen display 20 includes a liquid crystal display (LCD) (display unit) 21 and a touch-panel (instruction input receiving unit) 22. The touch-panel 22 is provided in a predetermined position on the PC body 10 to cover at least a display surface (screen) of the LCD 21.

The touchscreen display 20 detects an instruction input position (a touch position or a contact position) on the display screen which an external object (a stylus, one of the user's fingers, etc.) contacts. The touchscreen display 20 also comprises (supports) a multi-touch function capable of detecting a plurality of instruction input positions at the same time. As described above, the external object may be a stylus, one of the user's fingers, etc., but a finger is exemplified as the external object in the following descriptions.

The touchscreen display 20 is used as a main display which displays screens and images (objects) of various application programs in the tablet 1r The touchscreen display 20 accepts, when the PC body 10 is activated, execution launch (activation) of an arbitrary application program which the user attempts to activate by inputting an instruction by the external object, and displays icons of an arbitrary number of activated application programs. The orientation of the display screen of the touchscreen display 20 can be switched between landscape and portrait. FIG. 1 shows an example of display of an activation completion screen in the landscape orientation.

Figure 2:
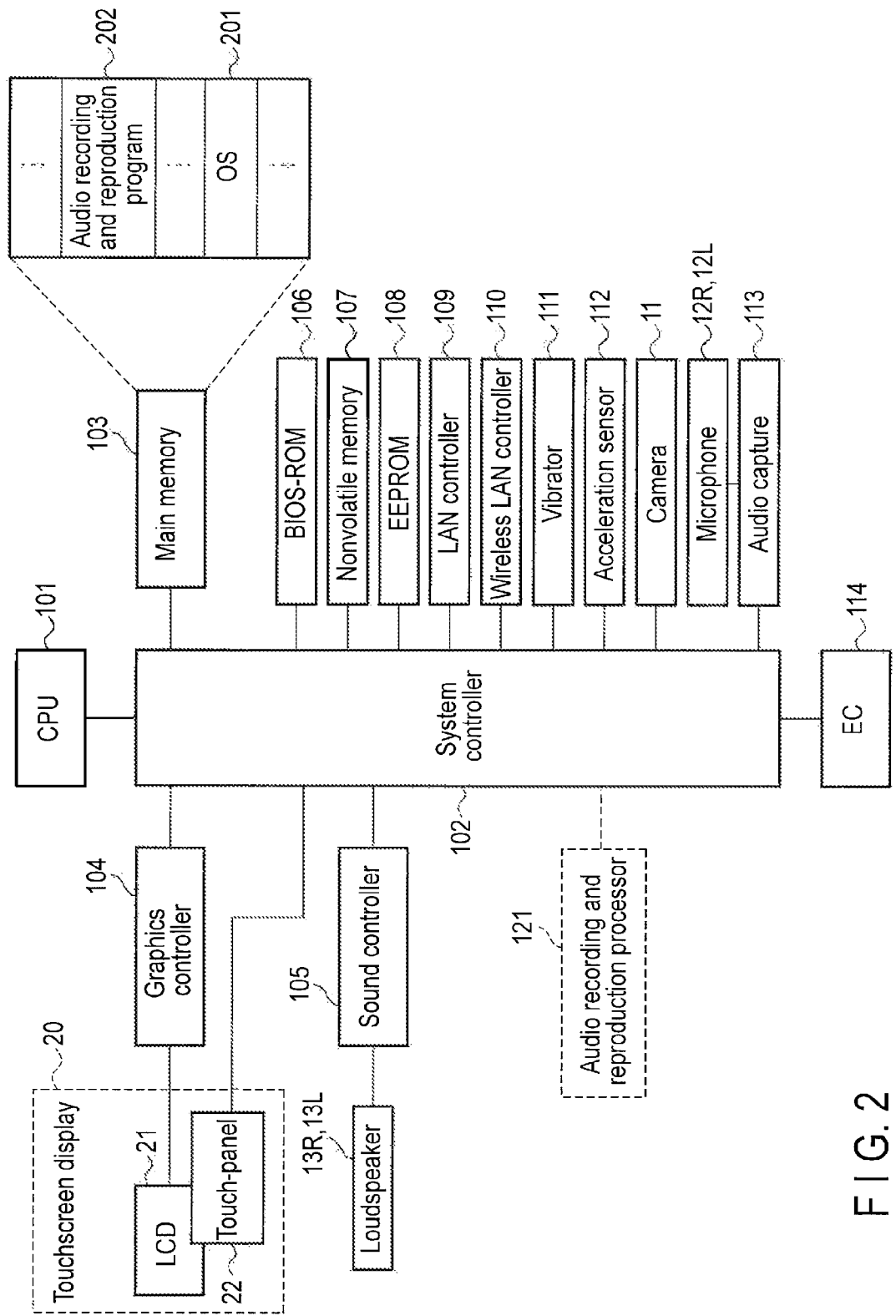
FIG. 2 is an exemplary block diagram showing an example of a system configuration of the electronic device of the embodiment.

FIG. 2 shows an example of a system configuration of the tablet 1.

As shown in FIG. 2, the tablet 1 comprises a CPU 101, a system controller 102, a main memory 103, a graphics controller 104, a sound controller 105, a BIOS-ROM 106, a nonvolatile memory 107, an EEPROM 108, a LAN controller 109, a wireless LAN controller 110, a vibrator 111, an acceleration sensor 112, an audio capture (board) 113, an embedded controller (EC) 114, etc.

The CPU 101 controls operations of each module of the PC body 10 and the touchscreen display 20. That is, the CPU 101 executes an operating system (OS) and various application programs loaded from the nonvolatile memory 107 into the main memory 103. An audio recording and reproduction program 202 described later is one of the application programs. The audio recording and reproduction program 202 is software executed under the control of the OS 201. The audio recording and reproduction program 202 can also be implemented as hardware by using an audio recording and reproduction processor 121 constituted by, for example, a single-chip microcomputer, etc.

The CPU 101 also executes the BIOS stored in the BIOS-ROM 106. The BIOS is a program for hardware control.

The system controller 102 is a device which makes a connection between a local bus of the CPU 101 and each component. The system controller 102 is equipped with a memory controller which executes access control of the main memory 103. The system controller 102 also comprises a function of communicating with the graphics controller 104 via a serial bus conforming to the PCI EXPRESS standard, etc.

The system controller 102 is also equipped with an ATA controller for controlling the nonvolatile memory 107. The system controller 102 is further equipped with a USB controller for controlling various USB devices. The system controller 102 also comprises a function of communicating with the sound controller 105 and the audio capture 113. Image (moving/still image) data acquired (shot) by the camera unit 11 is converted into a predetermined format in the camera unit 11, and supplied to an image processing program which operates on the main memory 103 via the system controller 102. The image data from the camera unit 11 is reproduced by the image processing program which is activated by a user request and can reproduce an image of a format corresponding to the image data from the camera unit 11, and displayed on the LCD 21. The image data from the camera unit 11 can be retained by, for example, the nonvolatile memory 107.

The graphics controller 104 is a display controller which controls the LCD 21 of the touchscreen display 20 of the PC body 10. A display signal generated by the graphics controller 104 is transmitted to the LCD 21, and the LCD 21 displays image based on the display signal. The touch-panel 22 on the LCD 21 is a pointing device (user operation instruction input mechanism) for inputting an input signal corresponding to display on the screen of the LCD 21. The user can input a user operation, i.e., an instruction to a graphical user interface (GUI), etc., displayed on the screen of the LCD 21 by using the touch-panel 22, and can thereby operate the PC body 10. That is, the user can give an instruction to execute a function corresponding to a launch icon or a button by touching the launch icon or the button displayed on the LCD 21 via the touch-panel 22.

The sound controller 105 is a sound source device. The sound controller 105 converts audio data to be reproduced into an analog output, and then outputs the converted data to the loudspeakers 13R and 13L.

The LAN controller 109 is a wired communication device which performs wired communication conforming to, for example, the IEEE 802.3 standard. The wireless LAN controller 110 is a wireless communication device which performs wireless communication conforming to, for example, the IEEE 802.11 standard.

The vibrator 111 provides the PC body 10 with vibration as necessary.

The acceleration sensor 112 detects rotation of the PC body 10 for switching between the portrait and landscape orientation of the display screen of the touchscreen display 20, intensity of an impulsive force of the movement of the user's finger, etc.

The audio capture 113 executes analog-to-digital conversion of voice or sound (audio) acquired by each of the microphone 12R (positioned, for example, on the right side of the camera unit 11) and the microphone 12L (positioned on the left side of the camera unit 11), and outputs a digital signal. The audio capture 113 inputs information indicating which of an input signal to the microphone 12R and an input signal to the microphone 12L has a greater level to the audio recording and reproduction program 202 which operates on the main memory 103 via the system controller 102. The audio capture 113 can execute a part or all of predetermined preprocessing utilizable in the audio recording and reproduction program 202.

The EC 114 is a single-chip microcomputer including an embedded controller for power management. The EC 114 controls power-on and power-off of the PC body 10 according to a power button operation by the user.

FIG. 3 is an exemplary block diagram showing an example of a functional configuration (functional blocks) of the audio recording and reproduction program 202 which runs on the tablet 1 having such a structure.

The audio recording and reproduction program 202 comprises a function of recording audio, reproducing the stored audio and editing the stored audio. The audio recording and reproduction program 202 comprises at least a touch information receiver 310, a controller 320, an audio reproduction processor 330 and a display processor 340 as functional modules for executing the program.

The touch information receiver 310 receives first coordinate information, second coordinate information and information on movement of the user's finger from the touch-panel 22 via a touchpanel driver 201A every time a user instruction (finger action by the user) is made, and outputs the received information to the controller 320. The first coordinate information is coordinate information (x, y) of an arbitrary position on the display surface of the touch-panel 22 touched by the user's finger. The second coordinate information is coordinate information (x', y') of a position on the display surface of the touch-panel 22 from which the user's finger is lifted. The information on the movement of the user's finger includes information on the movement of the user's finger between the first coordinate information (x, y) and the second coordinate information (x', y'), or the movement of the user's finger associated with the second coordinate information, for example, the direction of the movement when the finger is lifted, etc.

The user's operation inputs (finger actions by the user) and their names in the present embodiment are as follows:

(1) Touch: The user keeps a finger in a predetermined position on the display surface of the touch-panel 22 for a certain period. The first coordinate information and the second coordinate information are substantially the same. The finger is lifted in a direction approximately orthogonal to the display surface after the certain period.

(2) Tap: The user touches an arbitrary position on the display screen of the touch-panel 22 with a finger for a predetermined time, and then lifts the finger in a direction orthogonal to the display surface. A tap is often regarded as for the same as a touch.

(3) Swipe: The user touches an arbitrary position on the display screen of the touch-panel 22 with a finger, and then moves the finger in an arbitrary direction. Information on the movement of the finger is captured between the first coordinate information and the second coordinate information. That is, the user's finger moves over the display surface.

(4) Flick: After the user touches an arbitrary position on the display screen of the touch-panel 22 with a finger, the finger is moved in an arbitrary direction as if brushing the display surface, and is then lifted from the display surface. That is, a flick is a tap accompanied by information on the direction when the user's finger is lifted from the display surface.

(5) Pinch: After the user touches arbitrary positions on the touch-panel 22 with two fingers, the interval between the fingers on the display surface is changed. In particular, increasing the interval between the fingers (opening the fingers) is often called pinch out, and decreasing the interval (closing the fingers) is often called pinch in.

The controller 320 executes an operation corresponding to the user operation (instruction input by the user) specified by the information on the movements of the user's finger (1) to (5) described above based on the first coordinate information, the second coordinate information and the information on the movement of the user's finger output by the touch information receiver 310. In both a keyboard mode and a mouse mode described later, the controller 320 executes an operation corresponding to the instruction input by the user based on the first coordinate information, the second coordinate information and the information on the movement of the user's finger output by the touch information receiver 310. In this case, a touch (1) may be an operation according to a tap (2). In the present embodiment, the controller 320 is assumed to determine movement of the user's finger on the display surface of the touch-panel 22 following a touch as a swipe (3). When the controller 320 receives coordinate information (x', y') on the position where the user's finger moves away from the movement on the touch-panel 22, the controller 320 determines a swipe (3) or a flick (4). The controller 320 can also calculate a swipe length (instruction interval length) of the movement (swipe) of the user's finger on the display surface of the touch-panel 22 based on the first coordinate information, the second coordinate information and the information on the movement on the user's finger from the touch-panel 22.

The keyboard mode generally allows the touchscreen display 20 to be used as a virtual keyboard by outputting a character code unique to each key corresponding to a tap on an image of keyboard layout displayed on the LCD 21 from the touch-panel 22. The mouse mode is an operation mode which outputs relative coordinate data indicating a direction and a distance of movement of a contact position in accordance with the movement of the contact position (of the finger) on the touch-panel 22.

If the user touches an audio recording and reproduction icon 290 (FIG. 1) of predetermined icons (or buttons) displayed on the display surface of the touch-panel 22, an application associated with the audio recording and reproduction icon 290 corresponding to the coordinate information on the position on the display surface of the user's finger, i.e., the audio recording and reproduction program 202 is activated.

The controller 320 includes, for example, a speaker identification module 321, a speaker integration module 322, a speaker division module 323, etc., as functional modules for executing the audio recording and reproduction program 202.

The speaker identification module 321 is a module which analyzes voice and identifies a speaker. A specific method for identifying a speaker is described in detail in, for example, Jpn. Pat. Appln. KOKAI Publication No. 2011-

191824 (Japanese Patent No. 5174068), etc., but the detailed description is omitted. In the tablet 1, the speaker identification module 321 comprises two types of methods, i.e., a simple method (first method) identifying a speaker based on, for example, the input direction of voice, and a specific method (second method) identifying a speaker based on voice characteristics. When speech is recorded, the speaker identification module 321 first executes processing of identifying a speaker per speech period immediately by the first method for a digital signal (audio) output from the audio capture 113. When there are speech periods of the same speaker with a silent period shorter than a certain time therebetween, the speaker identification module 321 processes these periods as a speech period. When a speech of a speaker includes a speech of the other speaker shorter than a certain time, the speaker identification module 321 processes them as a speech period of the speaker without inserting a speech period of the other speaker. Display processing based on a result of the speaker identification is executed in real time when the speech is recorded.

The digital signal (audio) output from the audio capture 113 is stored in, for example, the nonvolatile memory 107 as audio data 401. The speaker identification module 321 secondly executes processing of identifying a speaker per speech period again by the second method for the audio data 401 as background processing. A result of the speaker identification is stored in, for example, the nonvolatile memory 107 as an index data 402. When the speech is reproduced, display processing based on the result of the speaker identification stored as the index data 402 is executed.

The speaker integration module 322 is a module for correcting the index data 402 to integrate speech identified as speech of a plurality of persons into speech of the same person when the speech of the same person is identified as the speech of the plurality of persons. The speaker division module 323 is a module for correcting the index data 402 to divide speech identified as speech of the same person into speech of a plurality of persons when the speech of the plurality of persons is identified as the speech of the same person. The tablet 1 comprises the speaker integration module 322 and the speaker division module 323, and provides a user interface which allows the user to correct the result of the speaker identification executed by the speaker identification module 321 by a simple operation.

The audio reproduction processor 330 is a module which processes an audio output signal to be reproduced in the audio recording and reproduction program 202. The audio reproduction processor 330 can control the sound controller 105 to vary an output ratio of reproduced audio output by the loudspeakers 13R and 13L based on, for example, a position of a speaker corresponding to audio data being reproduced so as to virtually duplicate the position of the speaker at recording.

The display processor 340 is a module which processes a display signal for displaying various types of information in a display screen 210 (FIG. 1) displayed on the touchscreen display 20 of the PC body 10.

Next, the operating principle of the audio recording and reproduction program 202 is described with reference to an example of displaying the display screen 210 on the touchscreen display 20 of the PC body 10 by the audio recording and reproduction program 202.

Figure 4:
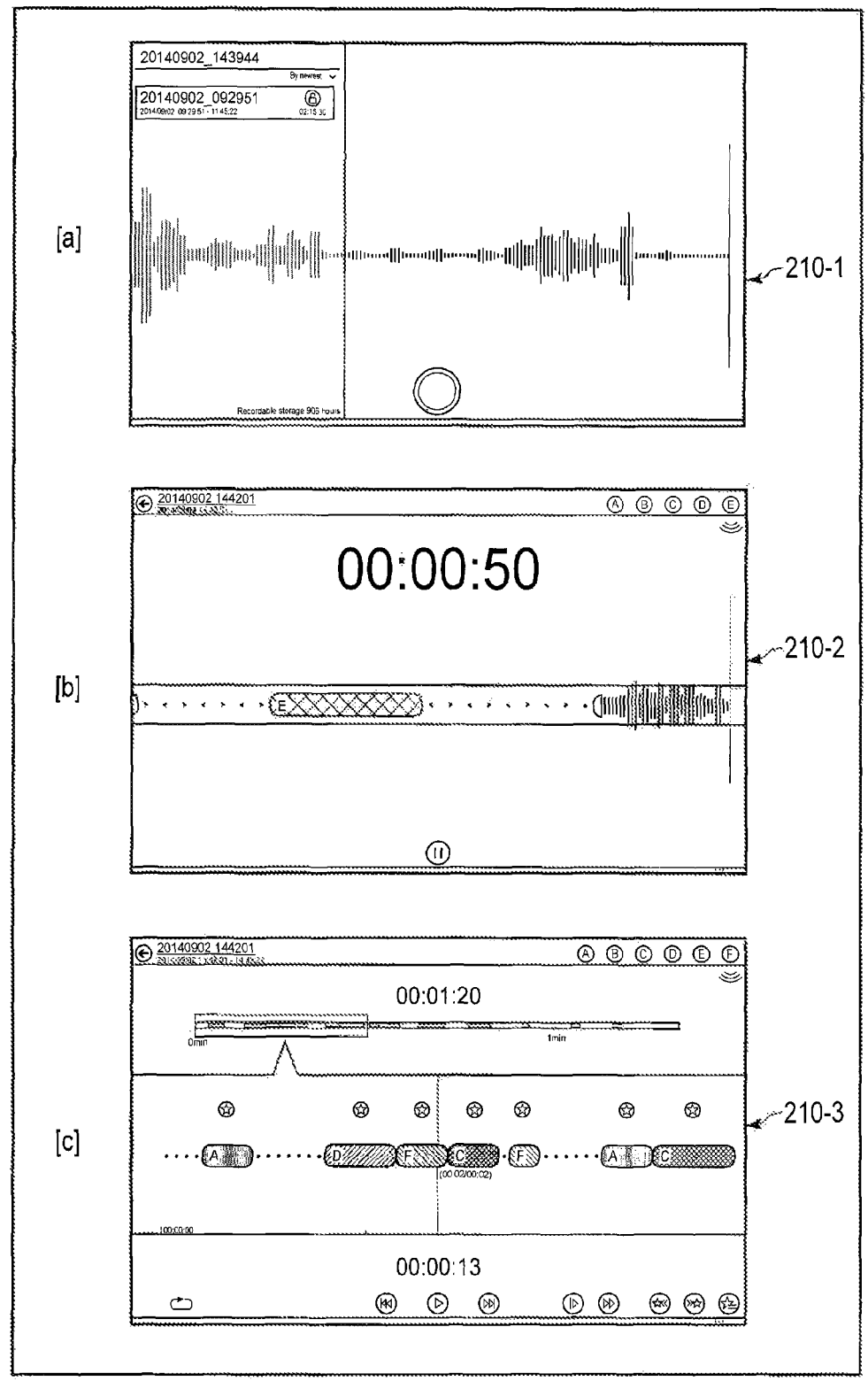
FIG. 4 is an exemplary illustration showing an example of a display screen displayed by the audio recording and reproduction program which operates on the electronic device of the embodiment.

As shown in FIG. 4, the audio recording and reproduction program 202 mainly displays three types of screens, i.e., a home screen 210-1 ([a] in FIG. 4), a recording screen 210-2 ([b] in FIG. 4) and a reproduction screen 210-3 ([c] in FIG. 4).

Figure 5:
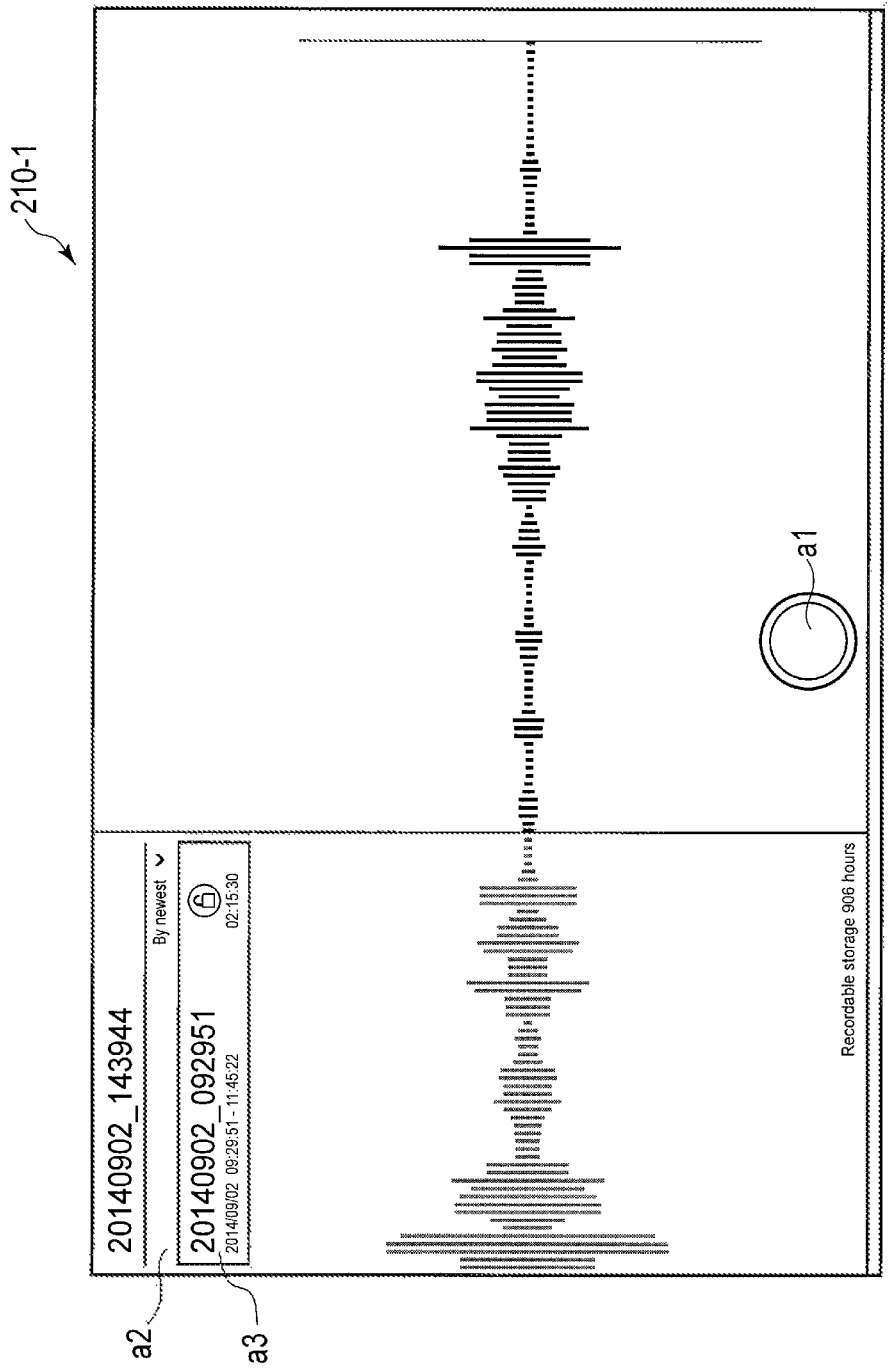
FIG. 5 is an exemplary illustration showing an example of a home screen displayed by the audio recording and reproduction program which operates on the electronic device of the embodiment.

The home screen 210-1 is a basic screen displayed by the audio recording and reproduction program 202 at activation. FIG. 5 is an enlarged illustration of the home screen 210-1 ([a] in FIG. 4).

As shown in FIG. 5, a recording button a1 for starting recording and a list a2 which shows a recorded audio data 401 as an option and also serves as a button for starting reproduction of the recorded audio data 401 are displayed on the home screen 210-1. In a display area (a3) of each recorded audio data 401 in the list a2, for example, various types of information such as a recording start time, a recording end time, a recording time, etc., necessary for the user to select a desired audio data 401 are displayed. A recorded audio data 401 alone is displayed in the list a2 in the present embodiment. If a plurality of audio data 401 are recorded, all the data are vertically ordered and displayed in the list a2. If the number of recorded audio data 401 is greater than the number of the data that can be displayed in the display area of the list a2, some of the data are displayed in the list a2, and the displayed recorded audio data 401 are scrolled by, for example, swiping or flicking on the display area of the list a2. The order of the recorded audio data 401 in the list a2 can be switched between the ascending order and the descending order of the recording start time.

The user can start recording by touching or tapping the recording button a1 in the home screen 210-1. The recording screen 210-2 ([b] in FIG. 4) is a screen displayed by the audio recording and reproduction program 202 during recording. FIG. 6 is an enlarged illustration of the recording screen 210-2 ([b] in FIG. 4).

In FIG. 6, a line b1 indicates a current time point. A state where the speech is recorded while a speaker is identified is shown with the line as the starting point. As described above, the audio recording and reproduction program 202 (the speaker identification module 321) executes the processing of identifying a speaker by the first simple method when the speech is recorded. An input level of the audio is shown during a period (b2) before a speaker is identified. When a speaker is identified, a speech period bar b3 indicating each speech period is displayed instead of the input level of the audio such that the speaker can be identified.

In the recording screen 210-2, a speaker mark b4 which indicates the identified speaker and, for example, to which the alphabet is assigned in the order identified is displayed per speaker. Up to ten speaker marks b4 (A to J) can be displayed. A speech mark b5 is also displayed in the recording screen 210-2. Speech mark b5 in the recording screen 210-2 indicates whether the audio is input or not, and is displayed when the audio is input. A stop button b6 for stopping recording is also displayed in the recording screen 210-2. The user can pause or stop recording by touching or tapping the stop button b6. If the recording is stopped, the home screen 210-1 shown in FIG. 5 is displayed again.

Figure 7:
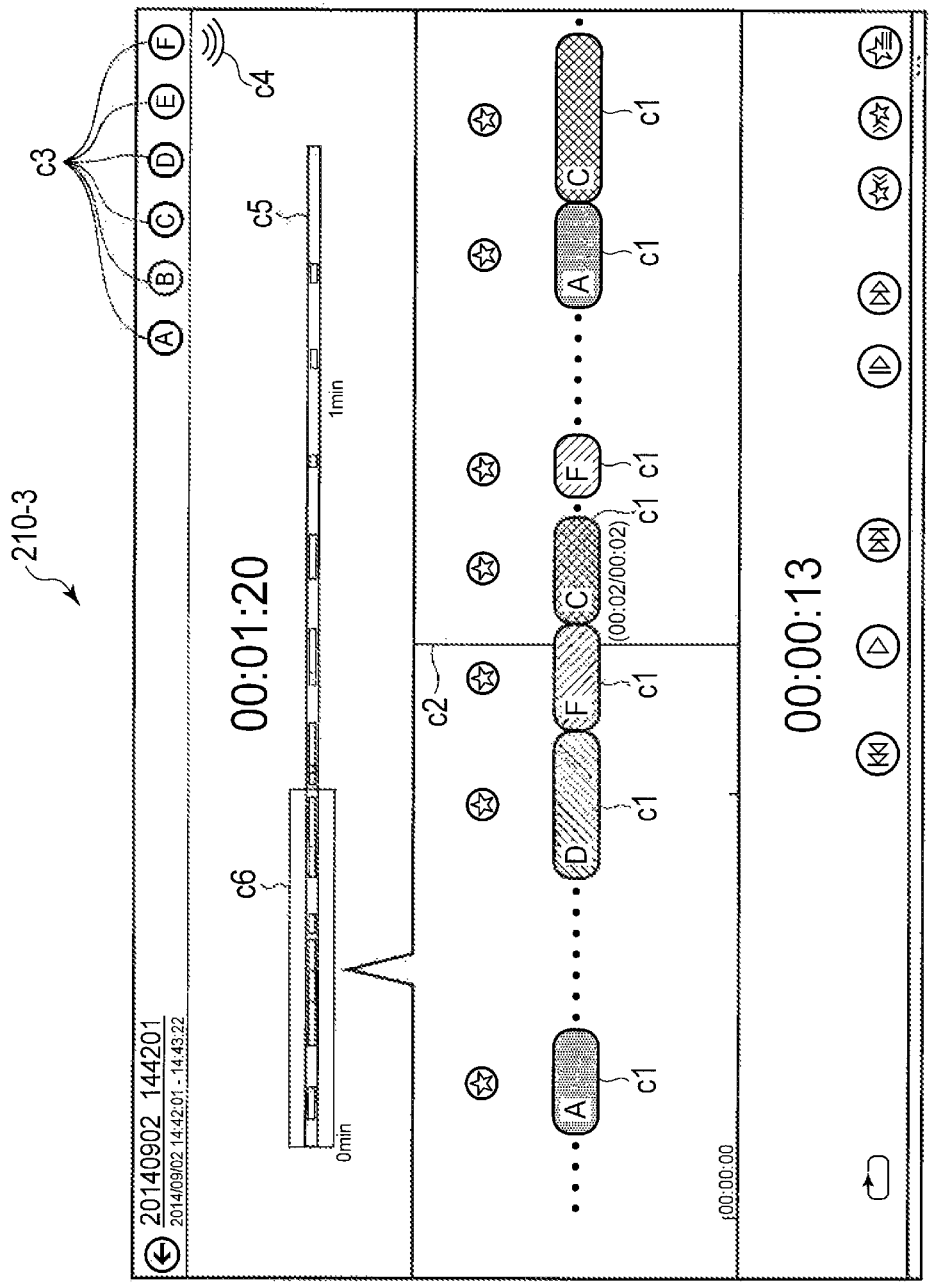
FIG. 7 is an exemplary illustration showing an example of a reproduction screen displayed by the audio recording and reproduction program which operates on the electronic device of the embodiment.

The user selects an audio data 401 shown as an option in the list a2 of the home screen 210-1 by touching or tapping the audio data 401, and can thereby start reproducing the audio data 401. The reproduction screen 210-3 ([c] in FIG. 4) is a screen displayed by the audio recording and reproduction program 202 during reproduction of the speech. FIG. 7 is an enlarged illustration of the reproduction screen 210-3 ([c] in FIG. 4).

As shown in FIG. 7, a speech period bar c1 indicating each speech period is also displayed in the reproduction screen 210-3 such that the speaker can be identified. A line c2 indicates a reproduction time point. In FIG. 7, since the line is positioned on a speech period bar c1 indicating a speech period of a speaker F, speech of speaker F is output. A speaker mark c3 and a speech mark c4 are also displayed in the reproduction screen 210-3. Speech mark c4 in the reproduction screen 210-3 indicates a speaker by being positioned below a speaker mark c3 indicating the speaker when the speech is output. In FIG. 7, speech mark c4 is positioned below speaker mark c3 indicating speaker F.

In the reproduction screen 210-3, a time bar c5 indicating a total recording period of the audio data 401 being reproduced, and a display range bar c6 indicating a display range of the speech period bar c1 in the total recording period of the audio data 401 are displayed.

As described above, the audio recording and reproduction program 202 can visualize the speech and support, for example, preparation of minutes of a meeting, etc.

Next, a user interface which is provided by the audio recording and reproduction program 202 and can correct the result of the speaker identification by a simple operation is described.

It is assumed that the audio data 401 is reproduced, and that the reproduction screen 210-3 shown in FIG. 7 is displayed on the touchscreen display 20. It is also assumed that speech of a speech period identified as speaker F must be essentially identified as a speaker D, but is erroneously identified as speaker F. That is, a speech period of speaker D is assumed to be unnecessarily divided into a speech period of speaker D and a speech period of speaker F. The user is assumed to realize the error by hearing the speech being reproduced, and to consider integrating the speech periods unnecessarily divided.

Figure 8:
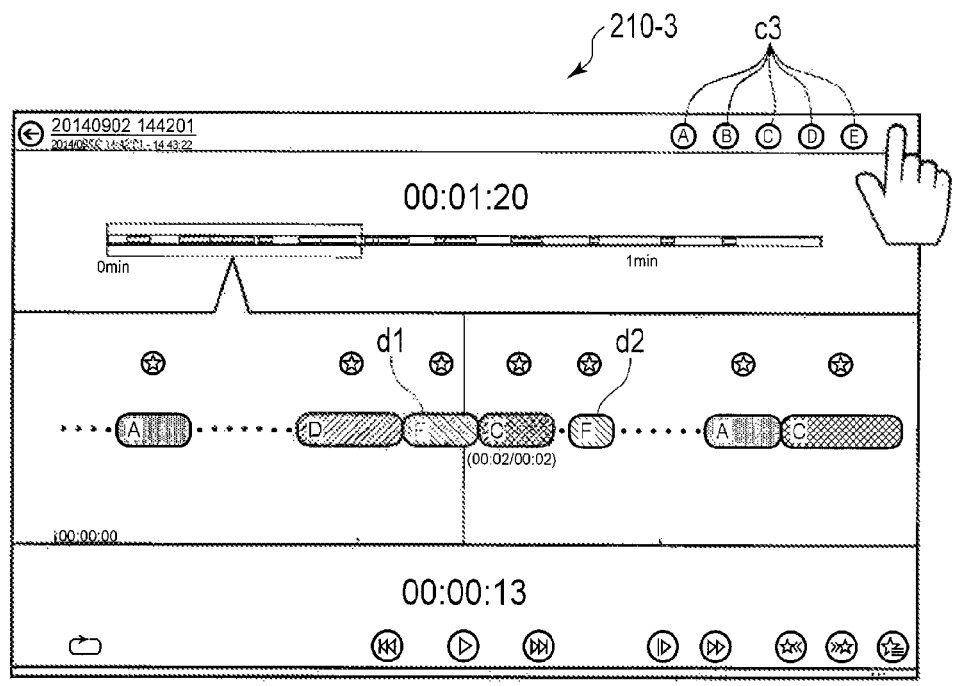
FIG. 8 is an exemplary first illustration for explaining a user interface provided for speaker integration by the audio recording and reproduction program which operates on the electronic device of the embodiment.

In such a case, the user first gives a long press to speaker mark c3 indicating speaker F as shown in FIG. 8. A long press is an operation input maintaining a touch state for more than a certain time. With a long press on speaker mark c3, the audio recording and reproduction program 202 (the controller 320) is shifted from a reproduction mode to an editing mode. The user is notified of the shift to the editing mode by, for example, a pause in reproduction. At this time, update of the reproduction screen 210-3 is also stopped. A speech period d1 in FIG. 8 is a speech period being reproduced, and a speech period of speaker D which is erroneously identified as speaker F. A speech period d2 in FIG. 8 is not a speech period being reproduced, but is a speech period of speaker D which is erroneously identified as speaker F similarly to the speech period d1.

Figure 9:
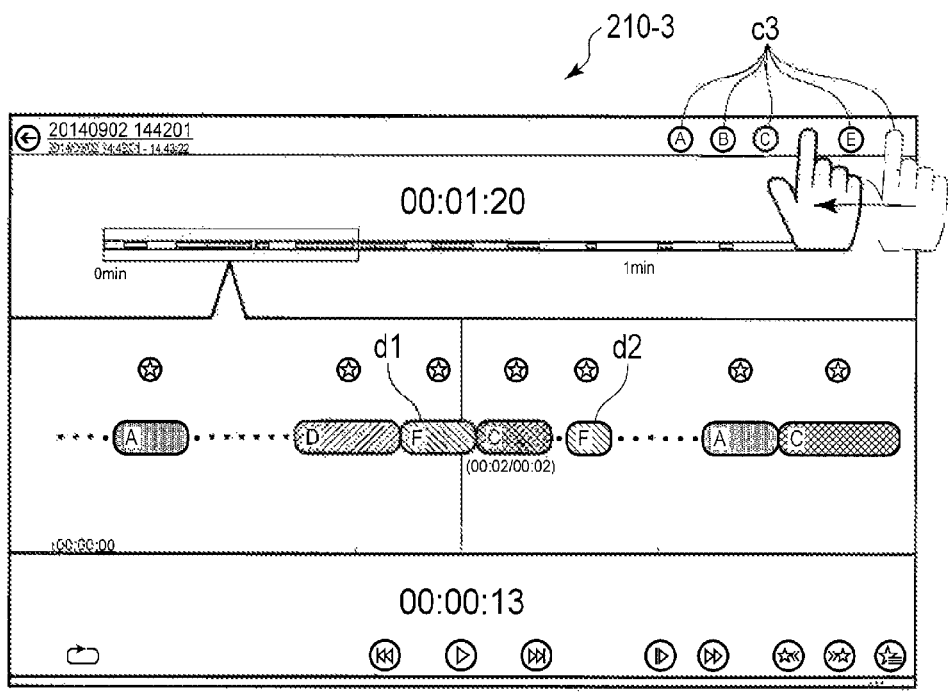
FIG. 9 is an exemplary second illustration for explaining the user interface provided for speaker integration by the audio recording and reproduction program which operates on the electronic device of the embodiment.

When the program is shifted to the editing mode, the user performs an operation input by moving the finger over the touchscreen display 20 to move the (long-pressed) speaker mark c3 indicating speaker F to overlap speaker mark c3 indicating speaker D as shown in FIG. 9. In response to the operation, the audio recording and reproduction program 202 (the speaker integration module 322) integrates the speech period of speaker F and the speech period of speaker D into a speech period of speaker D. FIG. 10 shows the reproduction screen 210-3 after the speech period of speaker F and the speech period of speaker D are integrated into the speech period of speaker D. As shown in FIG. 10, the speech period d1 of speaker F in FIG. 8 and FIG. 9 is integrated with the preceding and adjacent speech period of speaker D, and shown as a speech period e1 of speaker D. That is, the audio recording and reproduction program 202 (speaker integration module 322) can not only correct a speaker per speech period, but also integrate two or more speech periods into a speech period. A speech period d2 of speaker F in FIG. 8 and FIG. 9 which is not being reproduced is also shown as a speech period e2 of speaker D. That is, the user can correct the speech periods of the audio data 401 identified as speaker F to the speech period of speaker D collectively by a single operation. As shown in FIG. 10, the display of speaker mark c3 is also updated at this time.

When the integration of the speech periods is completed, the audio recording and reproduction program 202 (the controller 320) returns from the editing mode to the reproduction mode, and starts reproducing the speech again. The audio recording and reproduction program 202 (the controller 320) returns from the editing mode to the reproduction mode also when a touch is executed in an area other than display areas of the speaker marks and the speech periods on the touchscreen display 20.

Next, a case where speech of a plurality of persons is erroneously identified as speech of the same person and a speech period of the same person is divided into speech periods of a plurality of persons is described.

Such a case is considered to occur, for example, when speech of speaker F and speech of a speaker G similar to speaker F in speech characteristics are input from an approximately similar direction as shown in FIG. 11. In other words, although the speech characteristics are somewhat different, the speech of speaker F and the speech of speaker G may be integrated as the same speaker since they are input from the approximately similar direction.

In this case, too, it is assumed that the audio data 401 is reproduced, and that the reproduction screen 210-3 shown in FIG. 7 is displayed on the touchscreen display 20. It is also assumed that speech of a speech period which is being reproduced and identified as speaker F must be essentially identified as another speaker (speaker G), but is erroneously identified as speaker F. That is, the speech period of speaker F and a speech period of speaker G are assumed to be integrated into a speech period of speaker F. The user is assumed to realize the error by hearing the speech being reproduced, and to consider dividing the speech period unnecessarily integrated.

In such a case, the user first gives a long press to any one of the speaker marks and switches the reproduction mode to the editing mode in the same manner as that for the case of integration described above. When the program is shifted to the editing mode, the user touches a speech period bar f1 indicating the speech period to be divided from speaker F into speaker G as shown in FIG. 12. In FIG. 12, a speech period f2 is a speech period of speaker F (not speaker G).

In response to the operation, the audio recording and reproduction program 202 (the speaker division module 323) divides a speech period of which characteristics correspond to those of the speech of the touched speech period f1 as a speech period of speaker G from speech periods identified as speaker F. FIG. 13 shows the reproduction screen 210-3 after the speech period of speaker F is divided into a speech period of speaker F and a speech period of speaker G. In FIG. 13, the speech period f1 of speaker F in FIG. 12 is shown as a speech period g1 of speaker G, and the speech period f2 of speaker F in FIG. 12 remains as the speech period f2 of speaker F. That is, the user can collectively correct only a speech period to be identified as speaker G of the speech periods identified as speaker F in the audio data 401 to the speech period of speaker G. The display of speaker mark c3 is also updated at this time.

The audio recording and reproduction program 202 (the speaker division module 323) can not only correct a speaker per speech period, but also divide a speech period into two or more speech periods. More specifically, for example, when speaker G spoke immediately after speaker F spoke and their speech is integrated into a speech period as speech of speaker F, the audio recording and reproduction program 202 (the speaker division module 323) can divide the speech period into two speech periods (of speaker F and speaker G).

Figure 14:
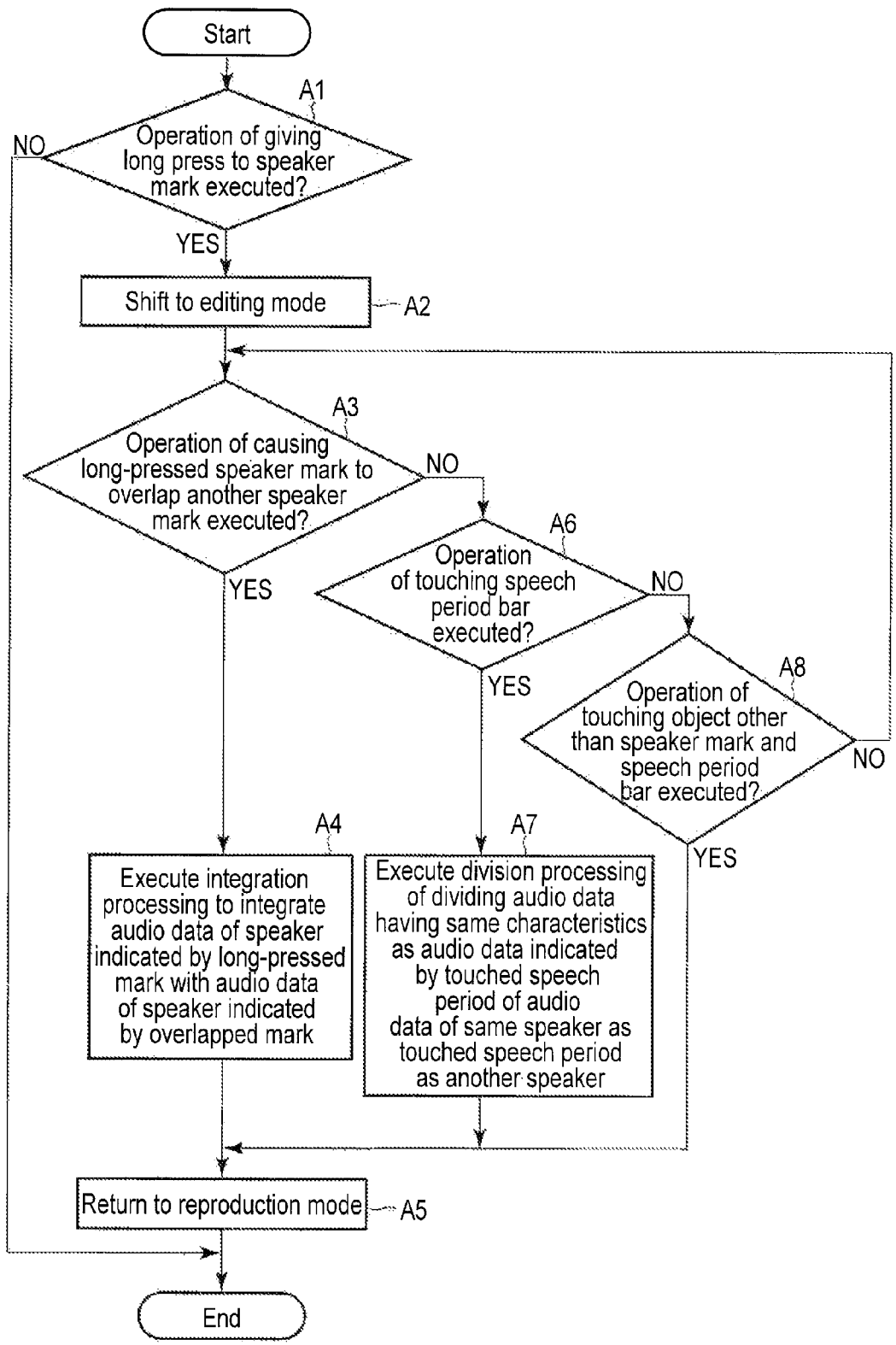
FIG. 14 is an exemplary flowchart showing an operation procedure related to the speaker integration or the speaker division of the electronic device of the embodiment.

FIG. 14 is an exemplary flowchart showing an operation procedure related to the speaker integration or the speaker division of the tablet 1.

During the speech reproduction, if an operation of giving a long press to the speaker mark is performed (YES in block A1), the tablet 1 is shifted from the reproduction mode to the editing mode (block A2). After the shift to the editing mode, if an operation of causing the long-pressed speaker mark to overlap the other speaker mark is performed (YES in block A3), the tablet 1 executes integration processing of integrating an audio data of a speaker indicated by the long-pressed speaker mark with an audio data of a speaker indicated by the overlapped speaker mark (block A4). After the execution of the integration processing, the tablet 1 is shifted from the editing mode to the reproduction mode (block A5).

After the shift to the editing mode, if an operation of touching a speech period bar (NO in block A3, YES in block A6), the tablet 1 executes division processing of dividing an audio data having the same characteristics as an audio data of the touched speech period bar of audio data of the same speaker as the touched speech period bar into the other speaker (block A7). After the execution of the division processing, the tablet 1 is shifted from the editing mode to the reproduction mode (block A5).

After the shift to the editing mode, if an operation of touching an object other than the speaker mark and the speech period bar (NO in block A6, YES in block A8), the tablet 1 is shifted from the editing mode to the reproduction mode (block A5).

As described above, the tablet 1 allows a result of speaker identification to be corrected by a simple operation when the speaker identification is erroneous, for example, when speech of the same person is identified as speech of a plurality of persons and when speech of a plurality of persons is identified as speech of the same person.

Each of the various functions described in the present embodiment may be implemented by a processing circuit (circuitry). Examples of the processing circuit include a programmed processor such as a central processing unit (CPU). The processor executes each of the described functions by executing a program stored in a memory. The processor may be a microprocessor including an electric circuit. Examples of the processing circuit also include a digital signal processor (DSP), an application specific integrated circuits (ASIC), a micro controller, a controller and other electric circuit components.

Since each of the procedures of the present embodiment can be executed by a computer program, the same advantage as the present embodiment can easily be achieved by merely installing the computer program on a general computer through a computer-readable storage medium, which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and sprit of the inventions.

What is claimed is:

1. An electronic device comprising:
    a receiver configured to receive audio data corresponding to speech from one or more speakers;
    a display controller configured to display a first object indicative of a first speaker, a first object indicative of a second speaker different from the first speaker, a second object indicative of a first speech period automatically identified as a speech of the first speaker, and a second object indicative of a second speech period automatically identified as a speech of the second speaker, based on the audio data; and
    circuitry configured to integrate the first speech period and the second speech period into a speech period of a same speaker and cause the integrated speech period to be displayed, when a first operation comprising an operation of associating the first object indicative of the first speaker with the first object indicative of the second speaker is operated,
    wherein the display controller is configured to display the first objects and the second objects based on a first speaker identification method when the audio data is input, and to display the first objects and the second objects based on a second speaker identification method different from the first method when the audio data is reproduced.

2. The device of claim 1, wherein the circuitry is configured to divide a third speech period automatically identified as a speech from a third speaker into a speech period of the third speaker and a fourth speech period automatically identified as a speech from a fourth speaker different from the third speaker and cause the divided speech periods to be displayed, when a second operation comprising an operation of specifying any one of second objects indicative of the third speech period is operated.

3. The device of claim 2, wherein the circuitry is configured to separate the single third speech period into two speech periods which are the third speech period and the fourth speech period based on the audio data of the specified speech period.

4. The device of claim 1, wherein three consecutive speech periods, comprising two speech periods of a fifth speaker and a speech period of a sixth speaker different from the fifth speaker in between the two speech periods of the fifth speaker, the speech period of the sixth speaker shorter than a threshold time, are recognized as a single speech period of the fifth speaker.

5. A method for an electronic device, the method comprising:
    receiving audio data corresponding to speech from one or more speakers;
    displaying a first object indicative of a first speaker, a first object indicative of a second speaker different from the first speaker, a second object indicative of a first speech period automatically identified as a speech of the first speaker, and a second object indicating a second speech period automatically identified as a speech of the second speaker, based on the audio data;
    integrating the first speech period and the second speech period into a speech period of a same speaker and displaying the integrated speech period, when a first operation comprising an operation of associating the first object indicative of the first speaker with the first object indicative of the second speaker is operated; and displaying the first objects and the second objects based on a first speaker identification method when the audio data is input, and displaying the first objects and the second objects based on a second speaker identification method different from the first method when the audio data is reproduced.

6. The method of claim 5, further comprising dividing a third speech period automatically identified as a speech of a third speaker into a speech period of the third speaker and a fourth speech period automatically identified as a speech of a fourth speaker different from the third speaker and displaying the divided speech periods, when a second operation comprising an operation of specifying any one of second objects indicative of the third speech period is operated.

7. The method of claim 6, further comprising separating the single third speech period into two speech periods which are the third speech period and the fourth speech period based on the audio data of the specified speech period.

8. The method of claim 5, wherein three speech periods, comprising two speech periods of a fifth speaker and a speech period of a sixth speaker different from the fifth speaker in between the two speech periods of the fifth speaker, the speech period of the sixth speaker shorter than a threshold time, are recognized as a single speech period of the fifth speaker.

9. A non-transitory computer-readable medium storing a computer program which is executable by a computer, the computer program controlling the computer to perform:

receiving audio data corresponding to speech from one or more speakers;

displaying a first object indicative of a first speaker, a first object indicative of a second speaker different from the first speaker, a second object indicative of a first speech period automatically identified as a speech of the first speaker, and a second object indicative of a second speech period automatically identified as a speech of the second speaker, based on the audio data;

integrating the first speech period and the second speech period into a speech period of a same speaker and displaying the integrated speech period, when a first operation comprising an operation of associating the first object indicative of the first speaker with the first object indicative of the second speaker is operated; and displaying the first objects and the second objects based on a first speaker identification method when the audio data is input, and to display the first objects and the second objects based on a second speaker identification method different from the first method when the audio data is reproduced.

10. The medium of claim 9, wherein the computer further performs:

dividing a third speech period automatically identified as a speech from a third speaker into a speech period of the third speaker and a fourth speech period automatically identified as a speech from a fourth speaker different from the third speaker and causing the divided speech periods to be displayed, when a second operation comprising an operation of specifying any one of second objects indicative of the third speech period is operated.

11. The medium of claim 10, wherein the computer further performs:

separating the single third speech period into two speech periods which are the third speech period and the fourth speech period based on the audio data of the specified speech period.

12. The medium of claim 9, wherein three consecutive speech periods, comprising two speech periods of a fifth speaker and a speech period of a sixth speaker different from the fifth speaker in between the two speech periods of the fifth speaker, the speech period of the sixth speaker shorter than a threshold time, are recognized as a single speech period of the fifth speaker.

* * * * *